United States Patent [19]

Wakabayashi

[11] Patent Number: 4,582,412
[45] Date of Patent: Apr. 15, 1986

[54] AUTOMATIC EXPOSURE CONTROL APPARATUS FOR SINGLE LENS REFLEX CAMERA

[75] Inventor: Tsutomu Wakabayashi, Tokyo, Japan

[73] Assignee: Nippon Kogaku K. K., Tokyo, Japan

[21] Appl. No.: 759,932

[22] Filed: Jul. 29, 1985

Related U.S. Application Data

[63] Continuation of Ser. No. 665,392, Oct. 26, 1984, abandoned.

[30] Foreign Application Priority Data

Oct. 31, 1983 [JP] Japan .................................. 58-204518

[51] Int. Cl.⁴ ........................... G03B 7/08; G03B 7/20
[52] U.S. Cl. ................................................ 354/442
[58] Field of Search ................. 354/441, 442, 443, 286

[56] References Cited

U.S. PATENT DOCUMENTS

| | | | |
|---|---|---|---|
| 4,086,584 | 4/1978 | Kozuki et al. | 354/442 |
| 4,089,014 | 5/1978 | Ueda et al. | 354/442 X |
| 4,269,497 | 5/1981 | Ishizaka et al. | 354/286 |
| 4,290,674 | 9/1981 | Kobori et al. | 354/443 X |
| 4,357,090 | 11/1982 | Araki et al. | 354/286 |
| 4,437,744 | 3/1984 | Terui et al. | 354/442 |

Primary Examiner—William B. Perkey
Attorney, Agent, or Firm—Shapiro and Shapiro

[57] ABSTRACT

An automatic exposure control apparatus for single lens reflex camera on which can be mounted either a lens adaptable for the automatic aperture control mode or a lens adaptable for the manual aperture control mode irrespective of the mode now being selected for the camera, can detect the type of the mounted lens and, when the mounted lens is of the type adaptable for the manual aperture control mode, it makes the camera forcedly select the manual aperture control mode as the exposure control mode thereof.

8 Claims, 6 Drawing Figures

AUTOMATIC EXPOSURE CONTROL APPARATUS FOR SINGLE LENS REFLEX CAMERA

This is a continuation application of Ser. No. 665,392, filed Oct. 26, 1984, now abandoned.

BACKGROUND OF THE INVENTION

1. Field of the Invention

The present invention relates to an automatic exposure control apparatus for single lens reflex camera.

2. Description of the Prior Art

At present the automatic exposure control of single lens reflex camera generally has four different modes, i.e., program mode, aperture priority mode, shutter time priority mode and manual mode.

The program mode is a mode in which both of the taking-lens aperture and the shutter time are automatically controlled in accordance with the luminance of object and the sensitivity of film. The aperture priority mode is a mode in which the shutter time is automatically controlled in accordance with the object luminance, film sensitivity and the set value of lens aperture. In the shutter time priority mode the lens aperture is automatically controlled in accordance with the object luminance, film sensitivity and the set value of shutter time. The manual mode is a mode in which both of the aperture and the shutter time are manually set.

The program mode and the shutter time priority mode belong to the automatic aperture control mode in which the aperture value is automatically controlled. The aperture priority mode and the manual mode belong to the manual aperture control mode in which the aperture value is manually set.

On the other hand there are two different types of lenses which can be mounted on the single lens reflex camera having the above four modes. The first is such type of lens adaptable for the automatic aperture control mode. The second is that adaptable for the manual aperture control mode. Therefore, as described in U.S. Pat. No. 4,269,497, it is required for the lens to be provided with means for generating a signal informing of whether the automatic aperture control mode is possible with the lens.

However, sometimes man fails in exposure by mounting a lens adaptable only for the manual aperture control mode after setting the camera to the automatic aperture control mode. The prior art automatic exposure control apparatus can not prevent this kind of failure in exposure.

SUMMARY OF THE INVENTION

Accordingly it is the principal object of this invention to provide an automatic exposure control apparatus for single lens reflex camera which eliminates the error as mentioned above and assures always correct exposure irrespective of whether the lens then used is that adaptable for the automatic aperture control mode or that adaptable only for the manual aperture control mode.

The subject of the invention is therefore an automatic exposure control apparatus for a camera on which can be mounted either a lens adaptable for the automatic aperture control mode or a lens adaptable for the manual aperture control mode irrespective of the mode now being selected for the camera, which automatic exposure control apparatus is characterized in that it detects the type of the mounted lens and, when the mounted lens is of the type adaptable for the manual aperture control mode, it makes the camera forcedly select the manual aperture control mode as the exposure control mode thereof.

Other and further objects, features and advantages of the invention will appear more fully from the following description taken in connection with the accompanying drawings.

DETAILED DESCRIPTION OF THE PREFERRED EMBODIMENTS

In the following description, the lens whose aperture changes in linear relation with the stroke of the diaphragm driving lever and hence which is suitable for exposure in the automatic aperture control mode is referred to as the lens for automatic aperture control (or the aperture-automatically controllable lens). The lens whose aperture changes in non-linear relation with the lever stroke and hence which is not suitable for exposure in the automatic aperture control mode is referred to as the lens for manual aperture control (or the aperture-automatically uncontrollable lens).

Figure 1:
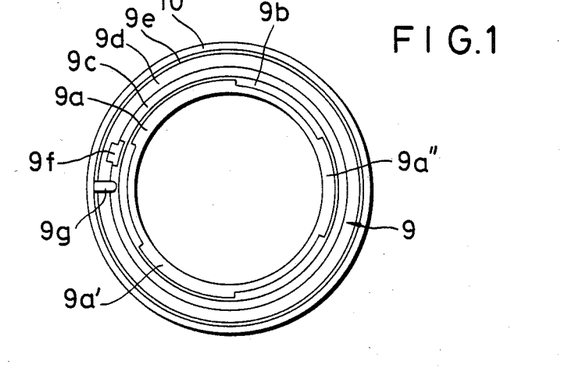
FIG. 1 is a front view of an aperture-controllable interchangeable lens.
Figure 2:
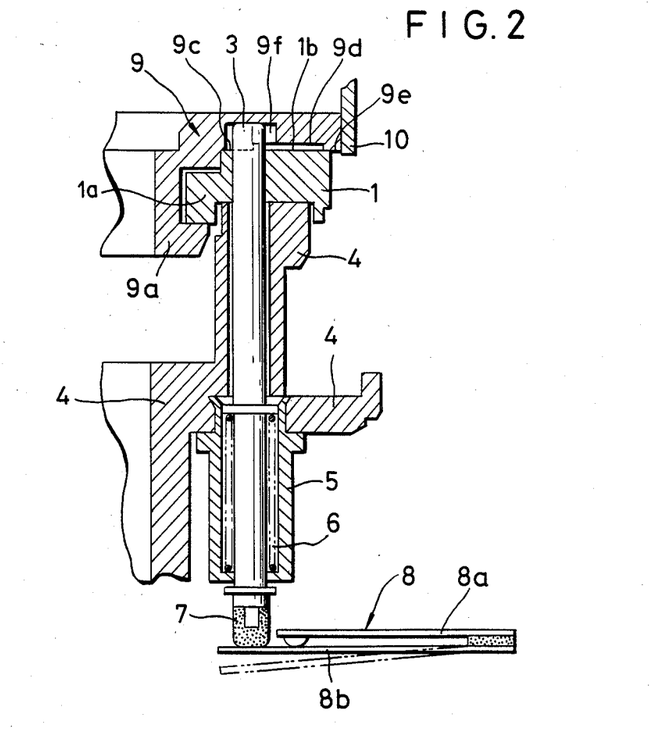
FIGS. 2 and 3 are sectional views showing the lens coupled with the mount part of the camera body.

An interchangeable lens for automatic aperture control held in a lens barrel is shown in FIG. 1. FIG. 2 illustrates the manner of mounting the lens on a camera body.

In mounting the lens, as shown in FIG. 2, a mount 1 on the camera body 4 and a mount 9 on the lens tube cooperate with each other. The camera body 4 is the body of a TTL metering type single lens reflex camera on which an interchangeable lens can be mounted.

The mount 1 on the camera body has a claw portion 1a and a mount reference surface 1b. 3 is a pin serving as a detection member. The detection pin 3 is provided near a positioning pin for lens attachment (not shown). A member 5 holds the detection pin 3 for axial slide movement. The pin 3 is biased upwardly by a spring 6. Attached to the lower end of the detection pin 3 is a dielectric member 7 to open a switch 8 comprising a pair of contacts 8a and 8b. The switch 8 is connected to a circuit as will be described later.

All of the above elements 1, 3, 4, 5, 6, 7 and 8 are provided on the camera body.

The mount 9 on the lens barrel has a claw 9a rising from the portion 9b and mount reference surfaces 9c, 9e. At a position a little retracted from the reference surfaces there is also formed a surface 9d. The lens barrel has a recession 9f into which the detection pin 3 can fall under the biasing force of the spring 6. 9g is a positioning slot for lens attachment. 10 is an outer shell. All of the above elements 9 and 10 are provided on the lens barrel.

The form and position of the recession 9f are determined so as to satisfy the following conditions:

The recession 9f should be on the locus of the slidable detection pin 3; and

The recession 9f should be disposed at a right angle to the binding line between the center of the mount and a point which lies approximately at the middle point between the start position 9f of the recession 9f and the stop position of the detection pin 3. The stop position means the position at which the detection pin 3 stops when the lens attachment positioning pin (not shown) and the lens attachment positioning slot 9g get into engagement with each other.

The lens is mounted on the camera body in the following manner:

At first man brings the mount reference surfaces (9c, 9d) of the lens for automatic aperture control into contact with the mount reference surface 1b on the camera body. Thereby the claw 9a on the lens barrel is inserted into a recession (not shown) provided on the camera body. Then, man rotates the lens barrel counterclockwise to bring the claw 9a into engagement with the claw 1a on the camera body. When the positioning slot 9g comes to the position opposed to the positioning pin on the camera body, the positioning pin falls into the positioning slot 9g to establish a bayonet coupling known per se. At the same, also the detection pin 3 falls into the recession 9f by the biasing force of the spring 6 as shown in FIG. 2. As a result of this upward movement of the detection pin 8, the switch 8 closes (see the solid line position of the switch contact 8b in FIG. 2).

The above is the operation connected with the mounting of the lens for automatic aperture control. When a lens for manual aperture control is mounted on the camera body, the operation is somehow different from the above because the lens for manual aperture control is provided with no recession 9f. The manner of the operation connected with the mounting of the lens for manual aperture control will be described with reference to FIG. 3.

Figure 3:
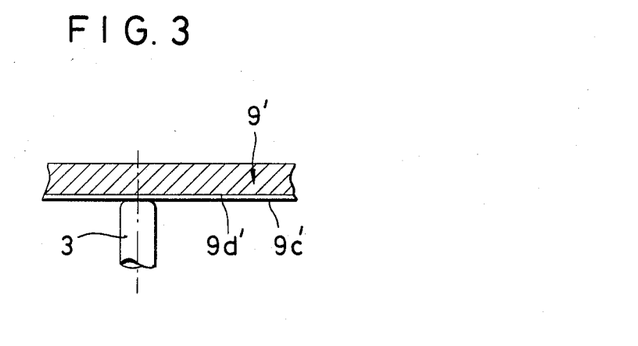

As shown in FIG. 3, the lens barrel mount 9' of the lens for manual aperture control has reference surfaces 9c' and 9d' 'for mounting but does not have any recession 9f. Other parts of the lens barrel mount 9' correspond to those of the above lens barrel mount 9 of the lens for automatic aperture control. Again, in the same manner as described above, the claw 9a on the lens is brought into engagement with the claw 1a on the camera body. At the same time, the positioning pin (not shown) on the camera body falls in the positioning slot 9g. However, since no recession 9f is provided on the lens barrel mount in this case, the detection pin 3 is kept at the position pushed down by the surface 9c' and can not move upwardly by the force of the biasing spring. Consequently, the switch 8 remains opened as suggested by the phantom line in FIG. 2.

As the lens mounting mechanism is formed as described above, man can mount on the camera body any desired one of the aperture-automatically controllable lens and the aperture-automatically uncontrollable lens. As previously mentioned, the camera itself is operable in the automatic aperture control mode. When one of the two different lenses is mounted on the camera, the discrimination between the two different lenses can be made from the opening and closing of the switch 8. In the shown apparatus, therefore, the switch 8 and the slide pin 3 constitute together means for detecting the type of the lens now being mounted on the camera.

Figure 4:
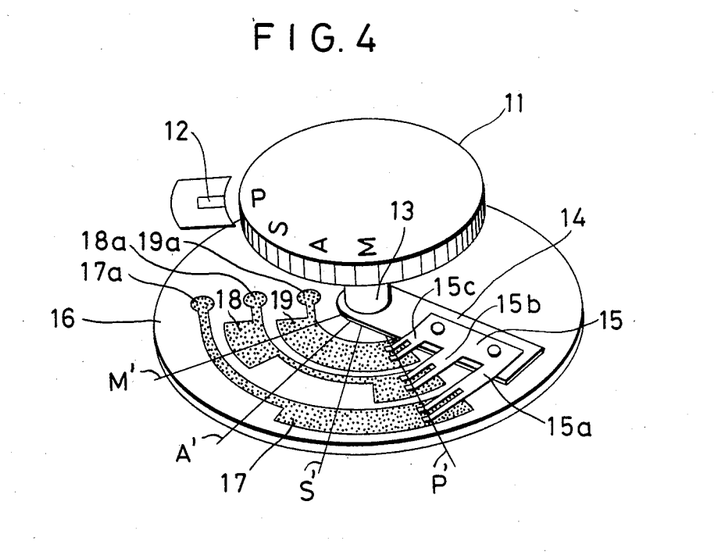
FIG. 4 is a perspective view of a mode selector dial.

FIG. 4 shows a form of an exposure control mode setting member.

In FIG. 4, the member designated by 11 is a mode selector dial. 12 is an index. Characters P, S, A and M marked on the dial 11 represent the program exposure control mode (hereinafter referred to as P mode in brief), the shutter time priority exposure control mode (S mode), the aperture priority exposure control mode (A mode) and the manual exposure control mode (M mode) respectively. By rotating the mode selector dial 11 up to the position in which the character P, S, A or M comes into alignment with the index 12, the desired mode, i.e., P mode, S mode, A mode or M mode can be set. A shaft 13 is connected with the dial 11 for rotation together with the dial. The shaft 13 has a plate 14 holding a branched slide brush 15. With the rotation of the dial 11, the branched brush 15 slide-moves on conductive patterns 17, 18, 19 formed on a dielectric substrate 16. More particularly, the outer branch 15a of the slid blush 15 slides on the conductive pattern 17, the middle branch 15b on the pattern 18 and the inner-most branch 15c on the pattern 19. The conductive patterns 17 and 18 are connected to a voltage source Vcc (high level) through contacts 17a and 18a and resistors respectively. The conductive pattern 19 is grounded through a contact 19a.

The manner of the exposure control mode setting operation by the mode selector dial 11 is as follows:

Man rotates the dial 11 to set any desired one of the dial marks P, S, A, M at the index 12. When the dial mark reaches the position of the index 12, the dial is stopped by a click mechanism (not shown) to fix the dial at the set position. By turning the mode selector dial 11 up to the set positions of P, S, A and M, the slide brush 15 is moved up to the positions P', S', A' and M' shown in FIG. 4 respectively. When the slide brush 15 is in a position at which the conductive patterns 17 and 18 are connected with the conductive pattern 19 by the slide brush 15, the conductive patterns 17 and 18 are grounded. Therefore, in this position, the outputs at the corresponding contacts 17a and 18a are at low level. On the contrary, when the slide brush is in a position not to connect the patterns 17 and 18 with the pattern 19, the outputs at the contacts 17a and 18a are at high level.

The relation between the set position of the mode selector dial 11 and the outputs at the contact points 17a, 17b will hereinunder be described in further detail with reference to FIG. 4.

When the dial 11 is turned to the set position of P, the branched contact end of the slide brush 15 takes the position indicated by P'. In this position, the conductive patterns 17 and 18 are connected with the conductive pattern 19 through the slide brush 15. Consequently both of the outputs at the contact points 17a and 18a of the patterns 17 and 18 are at low level. When the dial 11 is set to the S-position, the contact end of the slide brush 15 takes the position indicated by S'. In this position, the conductive pattern 17 is connected with the conductive pattern 19 through the slide brush 15 whereas the conductive pattern 18 remains disconnected from the conductive pattern 19. Consequently, the output at the contact point 17a is at low level and that at 18a is at high level.

When the dial 11 is set to the A-position, the tip end of the slide brush 15 takes the position indicated by A'. In this position, both of the conductive patterns 17 and 18 are disconnected from the conductive pattern 19. Consequently, both of the outputs at the contact points 17a and 18a are at high level.

Lastly, when the dial 11 is turned up to the set position of M, the contact end of the slide brush 15 takes the position indicated by M'. In this position, the conductive pattern 17 is disconnected from the conductive pattern 19 whereas the conductive pattern 18 is connected to the pattern 19 through the slide brush 15. Consequently, the output at the contact point 17a is at high level and the output at 18a is at low level.

Let "0" denote the low level of the output and "1" the high level. Then, the above relation between the set position of the dial 11 and the outputs at 17a, 18a may be summarized into the following table.

TABLE 1

| Set position of mode selector dial | Output | |
|---|---|---|
| | at 17a | at 18a |
| P position | 0 | 0 |
| S position | 0 | 1 |
| A position | 1 | 1 |
| M position | 1 | 0 |

Figure 5:
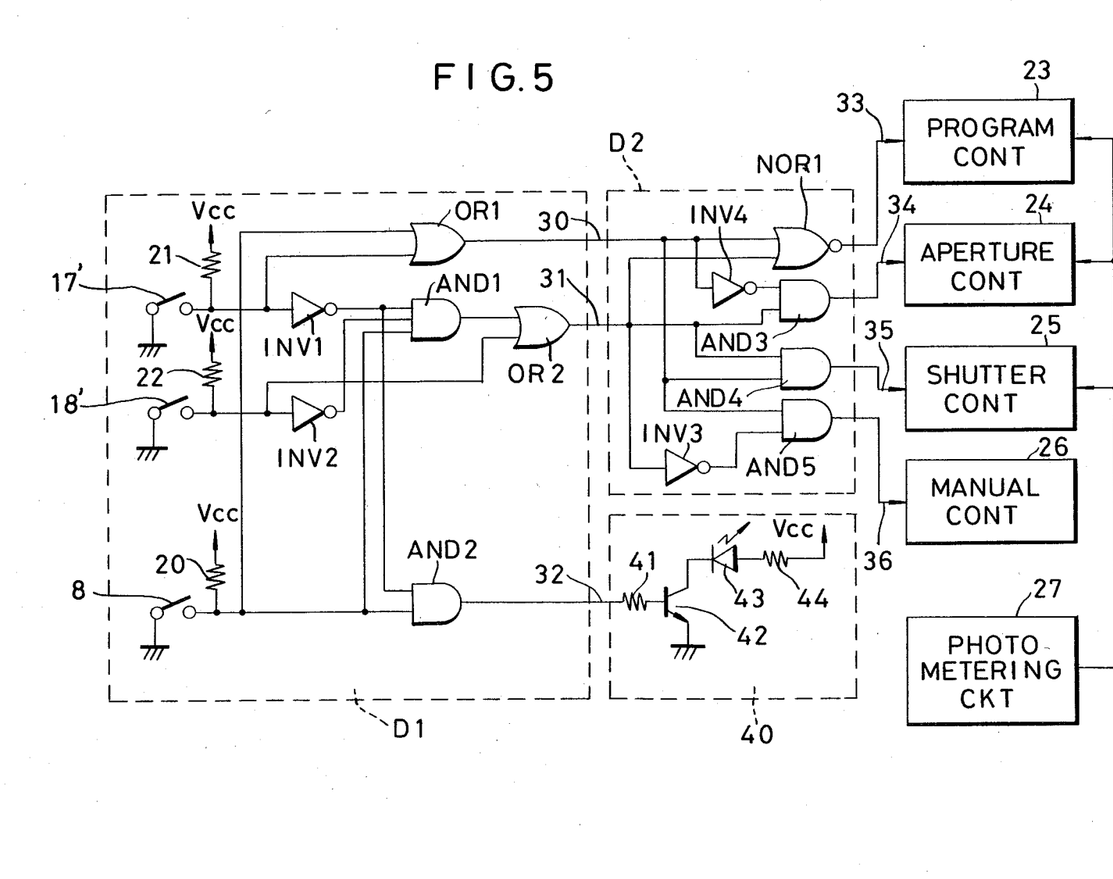
FIG. 5 is a circuit diagram showing a first embodiment of the invention.

FIG. 5 shows a first embodiment of the signal processor according to the present invention.

The signal processor receives signals from the above-shown apparatus. The switch 8 shown in FIG. 5 is the same as the switch 8 previously shown in FIG. 2. One end of the switch 8 is grounded and the other end is connected to a voltage source Vcc (high level) through a resistor 20.

Switch 17' in FIG. 5 is the switch composed of the slide brush 15 and the conductive patterns 17, 19 previously shown in FIG. 4. Since, as previously noted, the conductive pattern 17 is connected to a voltage source Vcc (high level) through a resistor and the conductive pattern 19 is grounded, the switch 17' in FIG. 5 is shown as a switch one end of which is grounded and the other end is connected to the voltage source Vcc (high level) through a resistor 21.

Switch 18' in FIG. 5 is the switch composed of the conductive patterns 18, 19 and the slide brush 15 previously shown in FIG. 4. Since, as previously noted in connection with FIG. 4, the conductive pattern 19 is grounded and the conductive pattern 18 is connected to a voltage source Vcc (high level) through a resistor, the switch 18' is shown in FIG. 5 as a switch one end of which is grounded and the other end is connected to the voltage source Vcc (high level) through a resistor 22.

A first discriminating circuit D1 comprises switches 8, 17', 18', resistors 20, 21, 22 inverters INV1, INV2, OR-gates OR1, OR2, and AND-gates AND1, AND2. 30, 31 and 32 are outputs of the gates OR1, OR2 and AND 2 respectively.

A second discriminating circuit D2 comprises inverters INV3, INV4, NOR-gate NOR1 and AND-gates AND3, AND4, AND5 and receives the outputs 30 and 31 from the first discriminating circuit.

A program control unit 23 receives the output 33 from the above gate NOR1 to perform exposure in P mode.

An aperture control unit 24 receives the output 34 from the above gate AND3 to perform the exposure in S mode.

A shutter control unit 25 receives the output 35 from the above gate AND4 to perform the exposure in A mode.

A manual control unit 26 receives the output 36 from the above gate AND5 to perform the exposure in M mode.

Designated by 40 is a display circuit. When the lens mounted on the camera is a lens for manual aperture control and the mode set at the time is P mode or S mode, the display circuit gives a warning signal to inform that the set mode is changed to A mode.

A photo metering circuit 27 measures the object luminance and applies an output of the measured luminance to the control units 23, 24 and 25. The program control unit 23 controls the aperture and the shutter time in accordance with the output from the photo metering circuit 27. The aperture control unit 24 controls the aperture in accordance with the output from the photo metering circuit 27 and the set value of shutter time. The shutter control circuit 25 controls the shutter in accordance with the output from the photo metering circuit 27 and the set value of aperture.

The display circuit 40 receives, as input thereto, the output 32 from the gate AND2 puts on a light-emitting diode 43 with a transistor 42 functioning as its switching element through a resistor 41. At the anode side the light-emitting diode 43 is connected to a voltage source Vcc (high level) through a resistor 44.

The manner of operation of the first discriminating circuit D1 is as follows:

When a lens for automatic aperture control is mounted, the switch 8 is closed as shown in FIG. 2. Therefore, the output of the switch is at low level. Receiving the low level output from the switch 8, the gate AND1 generates a low level output irrespective of the level of inputs to the remaining input terminals of the gate AND1. As the output of AND1 is at low level, the output 31 of the gate OR2 has the same level as the input to the other input terminal of the gate OR2, that is, the output from the switch 18'. In this case, therefore, the output 31 is low when P position is selected by the mode selector dial 11. When S position is selected, the output is rendered high. When A position is selected, the output becomes high and when M position is selected, it becomes low. On the other hand, since the inputs to the gate OR1 are the outputs from the switches 8 and 17', the output 30 from the gate OR1 corresponds to the output from the switch 17' because of the output of the switch 8 being low. Consequently, the output 30 is low when P position is selected by the mode selector dial 11. The output is also low when S position is selected. When the dial is set to A position and when the dial is set to M position, the output 30 is rendered high. Since the output from the switch 8 is at low level, the output of the gate AND2 is low irrespective of the level of the input to the other input terminal of AND2.

In summary, in the case where a lens for automatic aperture control is mounted on the camera, the outputs 30, 31 and 32 change depending on the set position of the mode selector dial 11 as shown in the following table.

TABLE 2

| Set position of mode selector dial | Output | | |
|---|---|---|---|
| | 30 | 31 | 32 |
| P position | 0 | 0 | 0 |
| S position | 0 | 1 | 0 |
| A position | 1 | 1 | 0 |
| M position | 1 | 0 | 0 |

When a lens for manual aperture control is mounted on the camera, the switch 8 is opened and its output becomes high. Therefore, the output 30 of the gate OR1 is at high level irrespective of the level of the input to the other input terminal of OR1. In this state, if the mode selector dial is set to P position, the switches 17' and 18' are closed as previously described. Therefore, both of the outputs of the switches 17' and 18' are at low level at the time. The inverted outputs of these switches 17', 18' are high and the output of the switch 18 is also at high level. All of the inputs to the gate AND1 are high and, therefore, the output of AND1 is at high level. This high level output is input to the gate OR2. Consequently, the output 31 from the gate OR2 is at high level irrespective of the level of the other input to OR2.

The output 32 from the gate AND2 is at high level because the inverted output of the switch 17' is high and the output of the switch 8 is also high. As previously described, by setting the mode selector dial 11 to S position, the switch 17' is closed and the switch 18' is opened. As a result, the output of the switch 18' becomes high and the output 31 from the gate OR2 is at high level irrespective of the level of the other input to OR2. The output of the switch 17' is low and its inverted output is high. The output of the switch 8 is also high. Therefore the output 32 from the gate AND2 is at high level at the time. By setting the mode selector dial 11 to A position both of the switches 17' and 18' are opened as previously described. Therefore, the output of the switch 18' becomes high and the output 31 from the gate OR2 is at high level irrespective of the level of the other input to OR2. The inverted output of the switch 17' is low and consequently the output 32 from the gate AND2 is at low level irrespective of the level of the other input to the gate. If the dial 11 is set to M position, the switch 17' is opened whereas the switch 18' is closed as previously described. Thereby the output of the switch 18' becomes low, which renders the output of the gate AND1 low level irrespective of the level of the other inputs to the gate. Since the output of the switch 18' is at low level and the output of the gate AND1 is at low level, the output 31 from the gate OR2 is also at low level. The output of the switch 17' is at high level and its inverted output is low. Consequently the output 32 from the gate AND2 is at low level irrespective of the level of the other input to AND2.

In summary, in the case where a lens for manual aperture control is mounted on the camera, the outputs 30, 31 and 32 change depending on the set position of the mode selector dial in the manner shown in the following table, Table 3.

TABLE 3

| Set position of | Output | | |
|---|---|---|---|
| mode selector dial | 30 | 31 | 32 |
| P position | 1 | 1 | 1 |
| S position | 1 | 1 | 1 |
| A position | 1 | 1 | 0 |
| M position | 1 | 0 | 0 |

As seen from the above, in the case where a lens for manual aperture control is mounted on the camera, the outputs 30 and 31 remain unchanged throughout the set positions of P, S and A of the mode selector dial 11. As for the output 32 it is seen that the level of the output 32 becomes high level only when the lens mounted is a lens for which the automatic aperture control is impossible (a lens for manual aperture control), and the set position of the mode selector dial 11 is P or S. In this embodiment, the first discriminating circuit D1 functions as exposure control mode setting means.

The outputs 30 and 31 are inputs to the second discriminating circuit D2. The manner of operation of the second discriminating circuit D2 will hereinunder be described.

At first, description will be made in connection with the case wherein a lens for automatic aperture control is mounted on the camera. In this case, as previously described regarding the first discriminating circuit D1, the outputs 30 and 31 change according to the set position of the mode selector dial 11 as follows:

When P mode is selected by the dial, the output 30 is at low level and the output 31 is also at low level.

When S mode is selected by the dial, the output 30 is low whereas the output 31 is high.

When A mode is selected by the dial, the output 30 is high and also the output 31 is high.

When M mode is selected by the dial, the output 30 is at high level whereas the output 31 is at low level.

Receiving the above inputs 30 and 31 from the circuit D1, the second discriminating circuit D2 generates the outputs 33, 34, 35 and 36 the levels of which change as follows:

When P mode is selected:

The output 33 is at high level because both of the inputs 30 and 31 to the gate NOR1 are low. The one input 31 to the gate AND3 is at low level. Therefore, the output 34 from the gate is low irrespective of the other input to AND3. The output 35 from the gate AND4 is at low level because both of the inputs 30 and 31 thereto are low. The input 30 to the gate AND5 is at low level and, therefore, the output 36 from the gate is low irrespective of the level of the other input to the gate AND5.

When S mode is selected:

The input 31 to the gate NOR1 is at high level. Therefore, the output 33 is at low level. The output 34 from AND3 is at high level because the inverted inputs 30 and 31 both are at high level. Since the input 30 to AND4 is at low level, the output 35 from the gate AND4 is at low level irrespective of the other input to the gate. The output 36 from AND5 is also at low level irrespective of the level of the other input because the one input 30 to the gate AND5 is low.

When A mode is selected:

Both of the inputs 30 and 31 to NOR1 are at high level and therefore the output 33 from NOR1 is at low level. Applied to one input of the gate AND3 is the inverted output 30 of low level. Therefore, the output 34 is at low level irrespective of the level of the other input of the gate AND3. The output 35 from the gate AND4 is at high level because both of the inputs 30 and 31 to the gate are at high level. The one input to the gate AND5 is the inverted output 31 which is at low level. Therefore, the output 36 is at low level irrespective of the level of the other input to AND5.

When M mode is selected:

The one input 30 to the gate NOR1 is at high level and, therefore, the output 33 from the gate is at low level irrespective of the level of the other input to the gate NOR1. Because the input 31 to AND3 is at low level, the output 34 of the gate AND3 is at low level irrespective of the level of the other input to the gate. Applied to one input terminal of the gate AND4 is the output 31 which is at low level. Therefore, the output 35 is at low level irrespective of the level of the other input to the gate AND4. The output 36 from the gate AND5 is at high level because both of the inverted outputs 30 and 31 applied to the gate are high.

As readily understood from the above, when P mode is selected, only the output 33 is at high level whereas the outputs 34, 35, 36 are all at low level. When S mode is selected, only the output 34 is at high level whereas the outputs 33, 35, 36 are all at low level. When A mode is selected, only the output 35 is high whereas the outputs 33, 34, 36 are all low. When M mode is selected, only the output 36 is high whereas the remaining outputs 33, 34,35 are all at low level. The following table, Table 4 is a summary of the above-described relation between the exposure control mode selected by the dial 11 and the inputs 30, 31 to and the outputs 33, 34, 35,36 from the second discriminating circuit D2 for the case wherein a lens for automatic aperture control is mounted on the camera.

TABLE 4

| Input 30 | Input 31 | Exposure control mode selected by the dial | Output 33 | Output 34 | Output 35 | Output 36 |
|---|---|---|---|---|---|---|
| 0 | 0 | P mode | 1 | 0 | 0 | 0 |
| 0 | 1 | S mode | 0 | 1 | 0 | 0 |
| 1 | 1 | A mode | 0 | 0 | 1 | 0 |
| 1 | 0 | M mode | 0 | 0 | 0 | 1 |

As seen from the above, among the outputs 33, 34, 35 and 36 from the second discriminating circuit D2, it is only one for every exposure control mode that becomes high level when an exposure control mode is selected. Therefore, if the respective control units 23, 24, 25,26 are so formed as to operate only when a high level input is applied to the control unit, then it is possible to bring only one of the control units 33–36 into operation for one exposure control mode then selected. For this reason, all the control unit 23, 24, 25,26 of the present embodiment have been formed in such manner that they can operate only when the input thereto is at high level. The operations of the respective control units will hereinafter be described in connection with the corresponding exposure control modes.

PROGRAM CONTROL UNIT 23

When P mode is selected, only the output 33 is at high level and the remaining outputs 34, 35, 36 of the second discriminating circuit D2 are at low level. Since the output 33 is input to the program control unit 23, only the unit 23 is operable among the control units 23–26 in this case. By depressing the release button (not shown) in this state, the aperture is controlled in accordance with a predetermined program. Thereafter, the shutter is released at a shutter time also determined by the program. In this manner, an exposure in the program control mode is performed.

APERTURE CONTROL UNIT 24

When S mode is selected, only the output 34 is at high level and the remaining outputs 33, 35, 36 of the second discriminating circuit D2 are all at low level. The output 34 is input to the aperture control unit 24. Therefore, of the four control units 23–26 only the aperture control unit 24 is operable. By depressing the release button in this state, the aperture control unit 24 is brought into operation. The aperture is controlled to an optimum aperture value for the shutter time preset by the shutter time setting dial (not shown). Thereafter the shutter is released at the preset shutter time. In this manner, an exposure in the shutter priority mode is carried out.

SHUTTER CONTROL UNIT 25

When A mode is selected, only the output 35 is at high level and the remaining outputs of the second discriminating circuit D2 are at low level. The output 35 is the input to the shutter control unit 25. Therefore, in this case, only the shutter control unit 35 is operable. By depressing the release button under this state, the aperture is stopped down to an aperture value preset by the aperture setting ring (not shown) provided on the lens tube. Thereafter the shutter is released. The shutter control unit 25 controls the shutter time to a value optimum for the preset aperture value. In this manner, an optimum exposure in the aperture priority mode is performed.

MANUAL CONTROL UNIT 26

When M mode is selected, only the output 36 is at high level and the remaining outputs 33, 34, 35 of the second discriminating circuit D2 are all at low level. The output 36 is input to the manual control unit 26. Therefore, in this case, only the manual control unit 26 is active. By depressing the release button on the camera under this state, a manually controlled exposure is performed with an aperture value preset by the aperture setting ring (not shown) and at a shutter time preset by the shutter time setting dial (not shown).

In the case wherein a lens for manual aperture control is mounted on the camera, the second discriminating circuit D2 operates in the following manner:

In this case, the switch 8 is opened. When the mode selector dial 11 is set to P- or S-position under this state, the outputs 30 and 31 generated thereby are entirely the same as those generated when a lens for automatic aperture control is mounted and the mode selector dial 11 is set to A position. Therefore, as previously described in connection with the case wherein a lens for automatic aperture control is mounted, the second discriminating circuit D2 generates a high level output only at the output 35. Since the output 35 is the input to the shutter control unit 25, it is only the shutter control unit that is operable in this case. Consequently, exposure is carried out in the aperture priority mode (A mode) even when man sets the mode selector dial 11 to P- or S-position. Of course, when the mode selector dial 11 is set to A- or M-position, exposure is carried out in the aperture priority exposure control mode (A mode) or the manual exposure control mode (M mode) in the same manner as in the case wherein a lens for automatic aperture control is mounted.

As another case, description will be made for the case wherein a lens for manual aperture control is mounted after setting the mode to automatic aperture control mode (P mode, S mode) on the camera.

In this case, as will be understood from the previous description, the mounting of the lens for manual aperture control on the camera body causes the pin 3 to slide downwardly in FIG. 2. Thereby the switch 8 is opened. Therefore, although the mode selector dial 11 has already been set to P- or S-position, there are produced the outputs 30 and 31 corresponding to those for A mode. As a result, the mode previously set on the camera is forcedly changed to the aperture priority control mode (A mode). There is also the possibility that a lens for manual aperture control may be mounted on the camera after setting the mode selector dial to the position for manual aperture control mode (A mode, M mode). In this case also the pin 3 is moved downwardly in FIG. 2. However, the exposure control mode previously set by the mode selector dial 11 is not further changed by the slide-down of the pin 3 in this case.

Also, a lens for automatic aperture control may be mounted on the camera even after setting the mode to the automatic aperture control mode (P mode, S mode) or to the manual aperture control mode (A mode, M mode). As previously described, the lens for automatic aperture control is provided with a recession 9f in which the pin 3 can fall under the biasing force of a spring. Therefore, at the completion of the mounting of the lens, the pin 3 is not in the position slide-moved downwardly but in the position fallen in the recession 9f in which position the switch 8 is not opened by the pin 3. As a matter of course, exposure is carried out in the exposure control mode previously selected by the mode selector dial 11 without any change.

It is advisable to make the photographer ascertain the exposure control mode in which this exposure is to be actually performed, immediately before the start of the exposure. This may be realized by making a display of the exposure control mode within the view-finder at the first half stroke of the release button (at the time when the release button has depressed a short distance but not completely).

The manner of operation of the display circuit 40 is as follows:

When a lens for manual aperture control is mounted on the camera and then P-mode or S-mode is selected by the mode selector dial 11, the input 32 is at high level as seen from Table 3 previously shown. Under this condition, the transistor 42 is conductive and the light-emitting diode 43 emits light. On the contrary, in the case where the input 32 is at low level, the transistor 42 is rendered non-conductive and, therefore, the light-emitting diode 43 can not emit light. As previously described, the output 32 from the first discriminating circuit D1 is at high level only when the type of the lens mounted on the camera is that not adaptable for automatic aperture control (a lens for manual aperture control) and the set position of the mode selector dial 11 is P or S. In other words, the output 32 is at high level only when the exposure control mode is changed from the mode selected by the dial to A mode. In all other cases the output 32 is always at low level. Therefore, the light-emitting diode 43 of the display circuit 40 emits light only when a lens for manual aperture control is mounted on the camera and then the mode selector dial 11 is set to P position or S position for automatic aperture control mode. Thus, the display circuit 40 gives the photographer a warning signal informing that the exposure control mode selected by the photographer is forcedly changed to A mode.

The operations of the first embodiment shown in FIG. 5 may be summarized as follows and in the following table, Table 5:

When a lens for automatic aperture control is mounted on the camera, the mode in which the exposure is really performed is the same as the exposure control mode selected by the mode selector dial 11. In this case, no warning signal is displayed. When a lens unsuitable for automatic aperture control is mounted on the camera and the mode selector dial 11 is set to P- or S-position, the exposure control mode selected by it is forcedly changed to A mode and the exposure is carried out actually in the A mode. The light-emitting diode 43 emits light to give a warning signal informing of the change of the mode to A-mode. However, when the mode selector dial 11 is set to A- or M-position with the lens unsuitable for automatic aperture control being mounted on the camera, the exposure is performed in the selected mode, i.e., A mode or M mode without changing the selected mode further. In this case, no warning signal is displayed either.

TABLE 5

| Set position of the mode selector dial | Type of the lens mounted | Exposure control mode executed | Warning signal |
|---|---|---|---|
| P position | Lens suitable for automatic aperture control | P mode | no |
| S position | | S mode | no |
| A position | | A mode | no |
| M position | | M mode | no |
| P position | Lens unsuitable for automatic aperture control | A mode | displayed |
| S position | | A mode | displayed |
| A position | | A mode | no |
| M position | | M mode | no |

Figure 6:
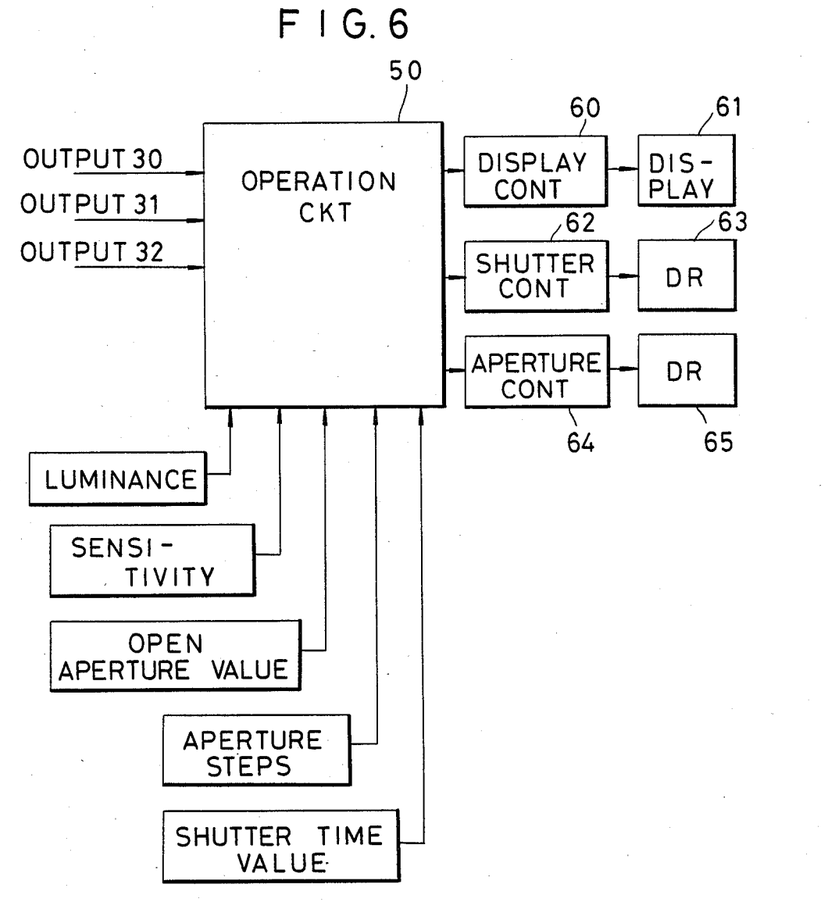
FIG. 6 is a circuit block diagram showing a second embodiment.

FIG. 6 shows a second embodiment of the invention. In FIG. 6, D1 corresponds to the first discriminating circuit shown in FIG. 5. Like reference characters to FIG. 5 represent the same or corresponding elements.

Designated by 50 is an operation circuit which receives the inputs 30, 31, 32 and various information 51, 52, 53, 54, 55, and carries out operations to operate the control circuits 60, 62, 64. 61 is a display unit, 63 is a shutter-driving unit and 65 is a diaphragm-driving unit.

The manner of operation of the second embodiment shown in FIG. 6 is as follows:

Of the inputs 30, 31, 32 applied to the operation circuit 50 the inputs 30 and 31 are inputs of information related to exposure mode and the input 32 is of information of whether the warning signal is to be displayed or not. As previously described with reference to FIG. 5, these input information 30, 31 and 32 are variable depending on the set position of the mode selector dial 11 and the type of the lens mounted (lens adaptable for automatic aperture control or lens not adaptable for automatic aperture control). 51 is information of luminance, 52 is information of film sensitivity and 53 is information of open aperture value of the lens. 54 is information of aperture steps. Herein, "aperture step" means the steps by which the aperture is stopped down from the open aperture value of the lens. 55 is information of shutter time preset by the shutter time-setting dial.

In accordance with the above input information 30, 31, 32, 51, 52, 53, 54 and 55 the operation circuit 50 carries out operations and transmits to the display control circuit 60 various necessary information such as that of exposure control mode, film sensitivity, optimum exposure value, preset exposure value, exposure value for taking and need or no need of warning signal. Also, it transmits to the shutter control circuit 62 information of preset shutter time or optimum shutter time. In case of the exposure mode in which the aperture is to be controlled, the operation circuit 50 transmits also information of optimum aperture value to the aperture control circuit 64.

Receiving the above outputs from the operation circuit 50, the display control circuit 60 controls the operation of the display unit 61, the shutter control circuit 62 controls the shutter time and the aperture control circuit 64 controls the aperture value. In this second embodiment, the exposure control mode and the warning signal are determined in the same manner as in the above first embodiment, that is, in the manner shown in Table 5. Of course, also in this second embodiment, the exposure control mode previously selected will be forcedly changed to A mode if a lens for manual aperture control is mounted on the camera after selecting the automatic aperture control mode by the mode selector dial 11.

In FIG. 6, the operation circuit 50 has been shown to receive, as its inputs, the outputs from the first discriminating circuit D1. However, it is naturally possible to apply the outputs of the switches 8, 17', 18' directly to the operation circuit 50 for carrying out the operations as shown in Table 5.

While the invention has been particularly shown and described with reference to preferred embodiments thereof, it is to be understood that the present invention is not limited to the above embodiments only. Obviously many modifications and variations of the present invention are possible in the light of the above teachings without departing from the scope of the invention.

For example, it is not always necessary to provide both of P mode and S mode as the automatic aperture control mode. The present invention is applicable to such apparatus provided with either one of P mode and S mode as the automatic aperture control mode.

Similarly, it is not always necessary to provide both of A mode and M mode as the manual aperture control mode. The present invention includes also such apparatus with only one of A mode and M mode as the manual aperture control mode.

In the above embodiments, the exposure control mode previously selected by the mode selector dial has been changed to A mode which is one of the manual aperture control mode, if a lens for manual aperture control (a lens not adaptable for automatic aperture control) is mounted on the camera after selecting an automatic aperture control mode. In this case, the mode previously selected may be changed to M mode which is another manual aperture control mode within the scope of the invention. However, it is preferable that the mode be changed to A mode rather than M mode. The reason for this is that since A mode is the aperture priority automatic exposure control mode, an optimum exposure is always assured by forcedly changing the mode to A mode.

What is claimed is:

1. An exposure control apparatus for a camera on which a first photo-taking lens and a second photo-taking lens can interchangeably be mounted and which is provided with first control means for controlling an aperture of said first photo-taking lens in accordance with a preset shutter speed value and luminance of an object and second control means for controlling a shutter in accordance with a preset aperture value and the luminance of the object, said exposure control apparatus comprising:
   (a) means for selecting one of said first and second control means, the selected control means being brought into operation;
   (b) means for detecting the mounting of said second photo-taking lens on the camera and generating a detection signal; and
   (c) means for inhibiting the operation of said first control means in response to said detection signal when the selected control means is said first control means.

2. An exposure control apparatus according to claim 1, which further comprises means for bringing said second control means into operation in response to said detection signal when the selected control means is said first control means.

3. An exposure control apparatus for a camera on which a first photo-taking lens and a second photo-taking lens can interchangeably be mounted and which is provided with first control means for controlling an aperture of said first photo-taking lens in accordance with a preset shutter speed value and luminance of an object and second control means for controlling a shutter in accordance with a preset aperture value and the luminance of the object, said exposure control apparatus comprising:
   (a) means for selecting one of said first and second control means, the selected control means being brought into operation;
   (b) means for detecting the mounting of said second photo-taking lens on the camera and generating a detection signal; and
   (c) means for making said selecting means select said second control means in response to said detection signal when the previously selected control means is said first control means.

4. An exposure control apparatus for a camera on which a first photo-taking lens and a second photo-taking lens can interchangeably be mounted and which is provided with first control means for controlling an aperture of said first photo-taking lens and a shutter in accordance with luminance of an object and second control means for controlling the shutter in accordance with a preset aperture value and the luminance of the object, said exposure control apparatus comprising:
   (a) means for selecting one of said first and second control means, the selected control means being bought into operation;
   (b) means for detecting the mounting of said second photo-taking lens on the camera and generating a detection signal; and
   (c) means for inhibiting the operation of said first control means in response to said detection signal when the selected control means is said first control means.

5. An exposure control apparatus according to claim 4, which further comprises means for bringing said second control means into operation in response to said detection signal when the selected control means is said first control means.

6. An exposure control apparatus for a camera on which a first photo-taking lens and a second photo-taking lens can interchangeably be mounted and which is provided with first control means for controlling an aperture of said first photo-taking lens and a shutter in accordance with luminance of an object and second control means for controlling the shutter in accordance with a preset aperture value and the luminance of the object, said exposure control apparatus comprising:
   (a) means for selecting one of said first and second control means, the selected control means being brought into operation;
   (b) means for detecting the mounting of said second photo-taking lens on the camera and generating a detection signal; and
   (c) means for making said selecting means select said second control means in response to said detection signal when the previously selected control means is said first control means.

7. An exposure control apparatus for a camera on which a first photo-taking lens and a second photo-taking lens can interchangeably be mounted and which is provided with first control means for controlling an aperture of said first photo-taking lens in accordance with a preset shutter speed value and luminance of an object, second control means for controlling the aperture of said first photo-taking lens and a shutter in accordance with the luminance of the object, and third control means for controlling the shutter in accordance with a preset aperture value and the luminance of the object, said exposure control apparatus comprising:

(a) selection means for selecting one of said first, second and third control means, the selected control means being brought into operation;

(b) means for detecting the mounting of said second photo-taking lens on the camera and generating a detection signal; and (c) means responsive to said detection signal for inhibiting the operation of said first control means when the selected control means is said first control means and inhibiting the operation of said second control means when the selected control means is said second control means.

8. An exposure control apparatus according to claim 7, which further comprises means responsive to said detection signal for bringing said third control means into operation when one of said first and second control means is selected by said selection means.

* * * * *

Notice of Adverse Decisions in Interference

In Interference No. 102,145, involving Patent No. 4,582,412, T. Wakabayashi, AUTOMARTIC EXPOSURE CONTROL APPARTUS FOR SINGLE LENS REFLEX CAMERA, final judgement adverse to the patentee was rendered July 12, 1990 as to claims 1-8.
*[Official Gazette October 23, 1990]*